(12) United States Patent
Steinmeister et al.

(10) Patent No.: US 9,834,655 B2
(45) Date of Patent: *Dec. 5, 2017

(54) POLYURETHANE FOAM AND METHOD FOR PRODUCING SAME

(75) Inventors: Dirk Steinmeister, Leverkusen (DE); Stephan Moers, Brüggen (DE); Stefan Lindner, Köln (DE); Wolfgang Friederichs, Köln (DE); Juergen Straeter, Dormagen (DE)

(73) Assignee: CONVESTRO DEUTSCHLAND AG, Leverkusen (DE)

( * ) Notice: Subject to any disclaimer, the term of this patent is extended or adjusted under 35 U.S.C. 154(b) by 497 days.

This patent is subject to a terminal disclaimer.

(21) Appl. No.: 14/113,594

(22) PCT Filed: Apr. 24, 2012

(86) PCT No.: PCT/EP2012/057433
§ 371 (c)(1),
(2), (4) Date: Nov. 13, 2013

(87) PCT Pub. No.: WO2012/146571
PCT Pub. Date: Nov. 1, 2012

(65) Prior Publication Data
US 2014/0066534 A1 Mar. 6, 2014

(30) Foreign Application Priority Data

Apr. 29, 2011 (DE) .................. 10 2011 050 014

(51) Int. Cl.
| | | |
|---|---|---|
| C08J 9/12 | (2006.01) |
| B01F 5/06 | (2006.01) |
| B29B 7/74 | (2006.01) |
| C08G 18/66 | (2006.01) |
| C08G 18/76 | (2006.01) |
| C08G 18/46 | (2006.01) |
| C08J 9/14 | (2006.01) |
| C08G 101/00 | (2006.01) |

(52) U.S. Cl.
CPC ............ C08J 9/122 (2013.01); B01F 5/0688 (2013.01); B29B 7/7457 (2013.01); C08G 18/4615 (2013.01); C08G 18/6677 (2013.01); C08G 18/7664 (2013.01); C08J 9/12 (2013.01); B01F 2215/0431 (2013.01); C08G 2101/0058 (2013.01); C08G 2101/0066 (2013.01); C08J 9/141 (2013.01); C08J 9/143 (2013.01); C08J 2203/08 (2013.01); C08J 2375/04 (2013.01)

(58) Field of Classification Search
CPC ... C08J 9/122; C08J 9/141; C08J 9/143; C08J 2202/08
See application file for complete search history.

(56) References Cited

U.S. PATENT DOCUMENTS

| | | | |
|---|---|---|---|
| 4,500,656 A * | 2/1985 | Rasshofer | C08G 18/3296 521/164 |
| 5,840,778 A | 11/1998 | Althausen et al. | |
| 2003/0144368 A1 | 7/2003 | Sulzbach et al. | |
| 2004/0054022 A1 | 3/2004 | Ohnuma et al. | |
| 2011/0184081 A1* | 7/2011 | Miyamoto | C08G 18/4027 521/97 |
| 2012/0238655 A1 | 9/2012 | Lindner et al. | |

FOREIGN PATENT DOCUMENTS

| | | |
|---|---|---|
| DE | 4442254 A1 | 5/1996 |
| EP | 0353061 A2 | 1/1990 |
| RU | 2339653 C2 | 11/2008 |
| WO | WO-96/02376 A1 | 2/1996 |
| WO | WO-01/10623 A1 | 2/2001 |
| WO | WO-01/98389 A1 | 12/2001 |
| WO | WO-2004/013201 A1 | 2/2004 |
| WO | WO-2011054868 A1 | 5/2011 |

OTHER PUBLICATIONS

International Search Report for PCT/EP2012/057433 dated Apr. 24, 2012.

* cited by examiner

Primary Examiner — Melissa Rioja
(74) Attorney, Agent, or Firm — K&L Gates LLP

(57) ABSTRACT

The invention relates to a method for producing a polyurethane foam, wherein a mixture having the following is discharged from a mixing head through a discharge line: A) a component reactive toward isocyanates; B) a surfactant component; C) a blowing agent component selected from the group comprising linear, branched, or cyclic C1 to C6 hydrocarbons, linear, branched, or cyclic C1 to C6 fluorocarbons, N2, O2, argon, and/or CO2, wherein the blowing agent C) is present in the supercritical or near-critical state; and D) a polyisocyanate component. The component A) has a hydroxyl value=100 mg KOH/g and =1000 mg KOH/g. The blowing agent component C) is present at least partially in the form of an emulsion, and means provided with an opening or several openings are arranged in the discharge line in order to increase the flow resistance during the discharge of the mixture comprising A), B), C), and D), wherein the cross-sectional area of the opening or the sum of the cross-sectional areas of all openings is =0.1% and =99.9% of the inner cross-sectional area of the discharge line.

14 Claims, No Drawings

POLYURETHANE FOAM AND METHOD FOR PRODUCING SAME

RELATED APPLICATIONS

This application is a national stage application (under 35 U.S.C. §371) of PCT/EP2012/057433, filed Apr. 24, 2012, which claims benefit of German Application No. 10 2011 050 014.6, filed Apr. 29, 2011, which is incorporated by reference herein.

The present invention relates to a method of producing a polyurethane foam wherein a mixing head discharges a mixture through a discharge line, said mixture comprising A) an isocyanate-reactive component; B) a surfactant component; C) a blowing agent component selected from the group comprising linear, branched or cyclic $C_1$ to $C_6$ hydrocarbons, linear, branched or cyclic $C_1$ to $C_6$ (hydro)fluorocarbons, $N_2$, $O_2$, argon and/or $CO_2$, wherein said blowing agent C) is in the supercritical or near-critical state; and D) a polyisocyanate component. The invention further relates to a polyurethane foam obtainable by this method.

Polyurethane foams are produced by reacting a polyol component, which also contains a blowing agent, with an isocyanate. The reaction of isocyanate with water produces carbon dioxide, which also acts as a blowing agent.

The decisive step for foam formation, and hence for the later cell size of the cured foam, is the nucleation provided by blowing agents, since each cell in the foam has been produced from a gas bubble. A relevant observation here is that after nucleation no new gas bubbles are generally produced, but instead blowing agent diffuses into existing gas bubbles.

Addition of stabilizers promotes the emulsification of the various components, influences nucleation and inhibits coalescence of growing gas bubbles. They also influence cell opening. In open-cell foams, the membranes of the growing pores are opened and the struts of the pores are left standing.

Sudden depressurization of $CO_2$-containing reaction mixtures is described in WO 2001/98389 A1. This application for a patent relates to a method for producing polyurethane slabstock foam wherein a reactive polyurethane mixture comprising carbon dioxide is abruptly depressurized from a pressure above the equilibrium solution pressure of the carbon dioxide to atmospheric pressure. As dissolved carbon dioxide escapes, the reactive liquid polyurethane mixture foams up; the foamed-up mixture is applied to a substrate and then cures to form the slabstock foam. The carbon dioxide is first fully dissolved in the reactive mixture, or in either or both of the components, polyol and isocyanate, at a pressure substantially above the equilibrium solution pressure. The pressure is then reduced to a pressure close to the equilibrium solution pressure by transiently dipping below the equilibrium solution pressure to evolve small amounts of the carbon dioxide and form a microdispersion of bubbles, mixing the components if appropriate, and the abrupt reduction in pressure to atmospheric pressure takes place before the evolved carbon dioxide is completely redissolved. However, there are no pointers here to nanocellular foams or supercritical conditions for the blowing agent.

US 2004/0054022 A1 discloses a preparation method for rigid polyurethane foam having a density of 20 to 40 kg/m$^3$ and an average value of 1.0 to 1.4 for the ratio of cell lengthwise-direction diameter to cross-direction diameter. The blowing agent used is $CO_2$ generated in the reaction between water and polyisocyanates plus supercritical, subcritical or liquid $CO_2$. Before mixing with the polyisocyanate, water and the liquid $CO_2$ are added to the polyol. Preferred $CO_2$ contents are between 0.5% and 3%. This makes sense bearing in mind that larger amounts of $CO_2$ would risk sudden vaporization.

The use of $CO_2$ as a physical blowing agent in the manufacture of flexible polyurethane foams is known, for example by the name of Novaflex® from Hennecke.

An inconvenient depressurization technique is needed here, and the amount of $CO_2$ is limited. FAPU (the European Polyurethane Journal) 59 (2010) 2, pages 33-35, says in this regard: "Tests by machine and raw-material producers have shown to date, however, that the maximum blowing agent content of dissolved $CO_2$ remains limited to about 2 wt % in the polyol component, since the expansion of the foam in high-pressure mixing is otherwise beyond control even in the mixing head, making it impossible to achieve a cell structure which is homogeneous."

DE 4442 254 A1 describes a process for producing foamed materials from two-component reactive plastics where carbon dioxide is used as a blowing agent, by mixing at least one of the reactive components with carbon dioxide under superatmospheric pressure, mixing the components, of which at least one contains carbon dioxide under superatmospheric pressure, depressurizing the reactive mixture obtained by mixing, which contains carbon dioxide, and curing. Depressurization is performed abruptly with the creation of high rates of shear. Since the carbon dioxide is in solution, a controlled, induced production of bubble nuclei has to "take place at the moment of the liquid reactive mixture transitioning from a state subsaturated in dissolved carbon dioxide into a state supersaturated with carbon dioxide, i.e., at the moment of depressurization from a pressure above the saturation pressure for dissolved carbon dioxide to a pressure below the saturation pressure for the dissolved carbon dioxide." The difference in pressure upstream and downstream of the slot is typically between 5 and 20 bar, which is distinctly below the 74 bar supercritical pressure of carbon dioxide.

WO 96/02376 A1 describes a method and apparatus for foam production using carbon dioxide dissolved under superatmospheric pressure. Since the carbon dioxide is in solution, bubble nuclei also have to be produced here. This is accomplished by the use of at least one slotted grating with narrow slot width.

WO 01/10623 A1 describes a process and a device for producing polyurethane foams. Here the carbon dioxide is maintained in the dissolved state by superatmospheric pressure. Nucleation is achieved by generating turbulency.

Improved methods of producing rigid polyurethane foams would be desirable. It is an object of the present invention to specify a method of this type which allows higher levels especially of the blowing agent $CO_2$ to be used in a controlled manner and with the formation of a cell structure which is homogeneous.

We have found that this object is achieved according to the present invention by a method of producing a polyurethane foam comprising the steps of:
providing a mixture in a mixing head, said mixture comprising:
A) an isocyanate-reactive component;
B) a surfactant component;
C) a blowing agent component selected from the group comprising linear, branched or cyclic $C_1$ to $C_6$ hydrocarbons, linear, branched or cyclic $C_1$ to $C_6$ (hydro)fluorocarbons, $N_2$, $O_2$, argon and/or $CO_2$, wherein said blowing agent C) is in the supercritical or near-critical state; and
D) a polyisocyanate component;

discharging the mixture comprising A), B), C) and D) from the mixing head through a discharge line.

The method is distinguished in that said isocyanate-reactive component A) has a hydroxyl number of ≥100 mg KOH/g to ≤1000 mg KOH/g, said blowing agent component C) is at least partly present in the form of an emulsion, and in that means having one or more apertures are disposed in the discharge line to elevate the flow resistance during the step of discharging the mixture comprising A), B), C) and D), wherein the cross-sectional area of the aperture or the sum total of the cross-sectional areas of all apertures amounts to ≥0.1% to ≤99.9% of the inner cross-sectional area of the discharge line.

It was found that, surprisingly, using a non-monophasic polyol-blowing agent mixture in combination with an apparatus for counterpressure maintenance and/or pressure enhancement in the efflux system of the mixing head and subsequent depressurization to ambient pressure overcomes the disadvantages of the prior art and provides finely cellular rigid polyurethane foams of low density.

In the step of discharging the mixture, the pressure prevailing in the mixture at a point downstream of the flow resistance elevator means in the discharge line is ultimately lowered to atmospheric pressure. Atmospheric pressure herein is to be understood as meaning a pressure of ≥0.9 bar to ≤1.1 bar in particular. The blowing agent transitions into the subcritical state and preferably into the gaseous state. For example, the reaction mixture can simply be introduced into an open mold or be used in a continuous manner for the production of sheets, as for example through free-foaming systems or twin-conveyor systems.

Examples of means disposed in (and preferably at the end of) the discharge line for elevating the flow resistance in the step of discharging the mixture comprising components A), B), C) and D) include sieves, slot diffusers, grids and/or perforate plates arranged downstream of a mixing chamber of the mixing head. Flow resistance elevation intentionally influences the pressure of the reaction mixture prior to discharge from the mixing head. The pressure thus set can be lower than the pressure during the mixing of the components of the reaction mixture. This makes it possible to influence the formation and expansion of blowing agent droplets or of small bubbles of blowing agent. Means of this type are described in WO 2001/98389 A1 for example.

One or more apertures each have a cross-sectional area. This is that area of the aperture which is perpendicular to the longitudinal direction of the efflux pipe and thus perpendicular to the direction of flow of the reaction mixture. So this cross-sectional area ultimately indicates the area wherethrough the reaction mixture flows in the course of being discharged to the outside.

Similarly, the discharge line has an inner diameter and thus also an inner cross-sectional area, which stands at right angles to the direction of flow of the reaction mixture.

In a simple example, the discharge line from the mixing head is a straight or angled cylindrical pipe having an inner diameter of ≥5 mm to ≤15 mm and fitted at its downstream end with a perforate plate with a circular hole ≥0.5 mm to ≤1.5 mm in diameter.

The OH number of component A) is also the OH number of a single polyol added. The average OH number is specified in the case of mixtures. This value in the context of the present invention can generally be determined by reference to DIN 53240. The higher the OH number, the worse the solubility in the polyol mixture of the blowing agent $CO_2$ in particular. This is in keeping with the intention of the present invention, since blowing agent emulsions are sought. Preferred values in respect of the OH numbers of component A) are ≥200 mg KOH/g to ≤600 mg KOH/g and more preferably ≥300 mg KOH/g to ≤550 mg KOH/g.

Useful surfactants B) for the method of the present invention are initially not subject to any restrictions with regard to their selection. The surfactants ideally enable the blowing agent to form emulsions or microemulsions in the isocyanate-reactive phase. Examples of surfactants are alkoxylated alkanols such as ethers of linear or branched alkanols having ≥6 to ≤30 carbon atoms with polyalkylene glycols having ≥5 to ≤100 alkylene oxide units, alkoxylated alkylphenols, alkoxylated fatty acids, carboxylic esters of an alkoxylated sorbitan (especially Polysorbate 80), fatty acid esters, polyalkyleneamines, alkyl sulfates, phosphatidylinositols, fluorinated surfactants, surfactants comprising polysiloxane groups, and/or bis(2-ethyl-1-hexyl) sulfosuccinate. Fluorinated surfactants can be perfluorinated or partially fluorinated. Examples thereof are partially fluorinated ethoxylated alkanols or carboxylic acids.

It is further envisioned that blowing agent component C) is at least partly present in the form of an emulsion.

Supercritical or near-critical blowing agent C) is used to produce the polyurethane foam. Conditions are near-critical in the context of the present invention when the following condition is satisfied: $(T_c-T)/T \leq 0.4$ and/or $(p_c-p)/p \leq 0.4$, where T is the temperature prevailing in the process, $T_c$ is the critical temperature of the blowing agent or blowing agent mixture, p is the pressure prevailing in the process and $p_c$ is the critical pressure for the blowing agent or blowing agent mixture. Conditions are preferably near-critical when: $(T_c-T)/T \leq 0.3$ and/or $(p_c-p)/p \leq 0.3$ and more preferably $(T_c-T)/T \leq 0.2$ and/or $(p_c-p)/p \leq 0.2$. Without wishing to be tied to any one theory, it is believed that the choice of suitable surfactant components ensures that emulsions or microemulsions of the supercritical or near-critical blowing agent form in the phase comprising isocyanate-reactive components.

The blowing agent may preferably form its own phase in the reaction mixture. Supercritical carbon dioxide can be used for example. The carbon dioxide can be formed during the reaction to form the polyurethane foam, for example as a result of the reaction of isocyanates with water or with acids. Examples of further blowing agents are linear $C_1$-$C_6$ hydrocarbons, branched $C_4$-$C_6$ hydrocarbons and cyclic $C_3$-$C_6$ hydrocarbons. Specific examples of blowing agents are methane, ethane, propane, n-butane, isobutane, n-pentane, isopentane, cyclopentane, isohexane and/or cyclohexane. Further examples are the partially or perfluorinated derivatives of methane, ethane, propane, n-butane, isobutane, n-pentane, isopentane, cyclopentane, hexane, isohexane, 2,3-dimethylbutane and/or cyclohexane. Preference is given to using carbon dioxide or a blowing agent mixture having a carbon dioxide content of more than 30% by weight, preferably more than 50% by weight and more preferably more than 70% by weight.

The proportion of blowing agent in the reaction mixture comprising components A), B) and C), but not D), can be ≥5% by weight to ≤40% by weight for example.

Component D) is a polyisocyanate, i.e., an isocyanate having an NCO functionality of ≥2. The reaction mixture, then, can therefore react to give polyurethane foams or else to give polyisocyanurate foams. This reaction mixture can be produced directly in a mixing head.

Examples of suitable polyisocyanates of this type are 1,4-butylene diisocyanate, 1,5-pentane diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or their mixtures of any desired isomer content, 1,4-cyclohexylene diisocyanate, 1,4-phenylene diisocyanate, 2,4- and/or 2,6-tolylene diisocyanate (TDI), 1,5-naphthylene diisocyanate, 2,2'- and/or 2,4'- and/or 4,4'-diphenylmethane diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI), and also alkyl 2,6-diisocyanatohexanoates (lysine diisocyanates) having $C_1$ to $C_6$ alkyl groups. An isocyanate from the diphenylmethane diisocyanate series is preferred.

In addition to the aforementioned polyisocyanates, it is also possible to make concomitant use of proportions of modified diisocyanates of uretdione, isocyanurate, urethane, carbodiimide, uretoneimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4',4"-triisocyanate.

The isocyanate can be a prepolymer obtainable by reacting an isocyanate having an NCO functionality of $\geq 2$ and polyols having a molecular weight of $\geq 62$ g/mol to $\leq 8000$ g/mol and OH functionalities of $\geq 1.5$ to $\leq 6$.

It will be appreciated that still further customary auxiliary and added substances such as catalysts, flame retardants, release agents, fillers and the like can be used to produce the polyurethane foam.

The number of NCO groups in polyisocyanate component D) and the number of isocyanate-reactive groups of component A) can be in a numerical ratio of $\geq 50:100$ to $\leq 500:100$ relative to each other for example. This index can also be in a range of $\geq 160:100$ to $\leq 330:100$ or else $\geq 80:100$ to $\leq 140:100$.

The mixture comprising components A), B), C) and D) is obtainable for example by initially charging all the components other than the polyisocyanate component to a high-pressure mixing head under conditions supercritical or near-critical for the blowing agent and then admixing them with polyisocyanate D).

Suitable pressures in the mixing head and/or in the discharge line (upstream of the singly or multiply apertured means for elevating the flow resistance in the step of discharging the mixture comprising A), B), C) and D)) for producing the polyurethane foam can be in the range from $\geq 40$ bar to $\leq 300$ bar for example and may preferably be in the range from $\geq 60$ bar to $\leq 250$ bar. Suitable temperatures are $\geq 10°$ C. to $\leq 80°$ C. for example, preferably $\geq 25°$ C. to $\leq 60°$ C. Particular preference is given to pressures and temperatures above the critical point of $CO_2$, i.e., $\geq 73.7$ bar and $\geq 31°$ C.

Especially polyols, polyamines, polyamino alcohols and polythiols are suitable NCO-reactive components A).

Examples of polyamines are ethylenediamine, 1,2-diaminopropane, 1,3-diaminopropane, 1,4-diaminobutane, 1,6-diaminohexane, isophoronediamine, an isomeric mixture of 2,2,4- and 2,4,4-trimethylhexamethylenediamine, 2-methylpentamethylenediamine, diethylenetriamine, 1,3-xylylenediamine, 1,4-xylylenediamine, α,α,α',α'-tetramethyl-1,3-xylylenediamine, α,α,α',α'-tetramethyl-1,4-xylylenediamine, 4,4'-diaminodicyclohexylmethane, diethylmethylbenzenediamine (DETDA), 4,4'-diamino-3,3'-dichlorodiphenylmethanes (MOCAs), dimethylethylenediamine, 1,4-bis(aminomethyl)-cyclohexane, 4,4'-diamino-3,3'-dimethyldicyclohexylmethane and 4,4'-diamino-3,5-diethyl-3',5'-diisopropyldicyclohexylmethane. Polymeric polyamines such as polyoxyalkyleneamines are also suitable.

Examples of aminoalcohols are N-aminoethylethanolamine, ethanolamine, 3-aminopropanol, neopentanolamine and diethanolamine.

Examples of polythiols are di(2-mercaptoethyl) ether, pentaerythritol tetrakisthioglycolate, pentaerythritol tetrakis (3-mercaptopropionate) and 1,2-bis((2-mercaptoethyl)thio)-3-mercaptopropane.

Polyols can for example have a number-average molecular weight $M_n$ of $\geq 62$ g/mol to $\leq 8000$ g/mol, preferably of $\geq 90$ g/mol to $\leq 5000$ g/mol and more preferably of $\geq 92$ g/mol to $\geq 1000$ g/mol.

The average OH functionality of the recited polyols is for example $\geq 2$, for example in a range from $\geq 2$ to $\leq 6$, preferably from $\geq 2.1$ to $\leq 4$ and more preferably from $\geq 2.2$ to $\leq 3$.

Examples of polyether polyols that can be used according to the present invention are the polytetramethylene glycol polyethers that are obtainable through polymerization of tetrahydrofuran via cationic ring opening.

Useful polyether polyols further include addition products of styrene oxide, ethylene oxide, propylene oxide, butylene oxides and/or epichlorohydrin onto di- or polyfunctional starter molecules.

Examples of suitable starter molecules are water, ethylene glycol, diethylene glycol, butyldiglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol and also low molecular weight hydroxyl-containing esters of polyols of this type with dicarboxylic acids.

Suitable polyester polyols include polycondensates of di- and also tri- and tetraols and di- and also tri- and tetracarboxylic acids or of hydroxycarboxylic acids or of lactones. Instead of the free polycarboxylic acids it is also possible to use the corresponding polycarboxylic anhydrides, or corresponding polycarboxylic esters of lower alcohols, to produce the polyesters.

Examples of suitable diols are ethylene glycol, butylene glycol, diethylene glycol, triethylene glycol, polyalkylene glycols such as polyethylene glycol, also 1,2-propanediol, 1,3-propanediol, 1,3-butanediol, 1,4-butanediol, 1,6-hexanediol and isomers, neopentylglycol or neopentylglycol hydroxypivalate. Other polyols that can be used, alongside these, are those such as trimethylolpropane, glycerol, erythritol, pentaerythritol, trimethylolbenzene or trishydroxyethyl isocyanurate.

Examples of polycarboxylic acids that can be used are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. It is also possible to use the corresponding anhydrides as acid source.

To the extent that the average functionality of the polyol to be esterified is $\geq 2$, it is also possible to make additional concomitant use of monocarboxylic acids such as benzoic acid and hexanecarboxylic acid.

Examples of hydroxycarboxylic acids which can be used concomitantly as reactants during the production of a polyester polyol having terminal hydroxyl groups are hydroxycaproic acid, hydroxybutyric acid, hydroxydecanoic acid, hydroxystearic acid and the like. Suitable lactones include caprolactone, butyrolactone and homologs.

Polycarbonate polyols that can be used according to the present invention are hydroxyl-containing polycarbonates, for example polycarbonatediols. These are obtainable through reaction of carbonic acid derivatives, such as diphenyl carbonate, dimethyl carbonate or phosgene, with polyols, preferably diols, or through the copolymerization of alkylene oxides such as propylene oxide with carbon dioxide.

Examples of diols of this type are ethylene glycol, 1,2-propanediol, 1,3-propanediol, 1,3-butanediol, 1,4-butanediol, 1,6-hexanediol, 1,8-octanediol, neopentylglycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A and lactone-modified diols of the aforementioned type.

Instead of or in addition to pure polycarbonate diols, it is also possible to use polyether-polycarbonate diols.

Polyetherester polyols that can be used are compounds that contain ether groups, ester groups and OH groups. Suitable compounds for producing the polyetherester polyols are organic dicarboxylic acids having up to 12 carbon atoms, preferably aliphatic dicarboxylic acids having ≥4 to ≤6 carbon atoms or aromatic dicarboxylic acids, which are used individually or in a mixture. Examples that may be mentioned are suberic acid, azelaic acid, decanedicarboxylic acid, maleic acid, malonic acid, phthalic acid, pimelic acid and sebacic acid and also particularly glutaric acid, fumaric acid, succinic acid, adipic acid, phthalic acid, terephthalic acid and isoterephthalic acid. Examples of derivatives of said acids that can be used are their anhydrides and also their esters and hemiesters with low molecular weight monohydric alcohols having ≥1 to ≤4 carbon atoms.

Another component used for producing the polyetherester polyols are polyether polyols obtained through alkoxylation of starter molecules such as polyhydric alcohols. The starter molecules are at least difunctional, but can also optionally contain proportions of starter molecules of higher functionality, especially trifunctional starter molecules.

Examples of starter molecules are diols having number-average molecular weights $M_n$ of preferably ≥18 g/mol to ≤400 g/mol or of ≥62 g/mol to ≤200 g/mol such as 1,2-ethanediol, 1,3-propanediol, 1,2-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomer mixtures of alkylene glycols, such as diethylene glycol.

Polyols having number-average functionalities of >2 to ≤8, or of ≥3 to ≤4 can also be used concomitantly alongside the diols, examples being 1,1,1-trimethylolpropane, triethanolamine, glycerol, sorbitan and pentaerythritol, and also polyethylene oxide polyols started on triols or tetraols and having average molecular weights of preferably ≥62 g/mol to ≤400 g/mol or of ≥92 g/mol to ≤200 g/mol.

Polyetherester polyols are also obtainable through the alkoxylation of reaction products which are obtained by the reaction of organic dicarboxylic acids and diols. Examples of derivatives of said acids that can be used are their anyhdrides, for example phthalic anhydride.

Polyacrylate polyols are obtainable through free-radical polymerization of hydroxyl-containing olefinically unsaturated monomers or through free-radical copolymerization of hydroxyl-containing olefinically unsaturated monomers with optionally other olefinically unsaturated monomers. Examples thereof are ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable hydroxyl-containing olefinically unsaturated monomers are in particular 2-hydroxyethyl acrylate, 2-hydroxyethyl methacrylate, the hydroxypropyl acrylate isomer mixture obtainable through addition of propylene oxide onto acrylic acid and also the hydroxypropyl methacrylate isomer mixture obtainable through addition of propylene oxide onto methacrylic acid. Terminal hydroxyl groups can also be present in protected form. Suitable free-radical initiators are those from the group of the azo compounds, e.g., azoisobutyronitrile (AIBN), or from the group of the peroxides, e.g., di-tert-butyl peroxide.

In an example of a recipe, components A), B), C) and D) are present in the following amounts:
A) ≥25% by weight to ≤45% by weight
B) ≥0.5% by weight to ≤15% by weight
C) ≥4% by weight to ≤40% by weight
D) ≥30% by weight to ≤70% by weight.

The % by weight here sum to ≤100% by weight. Preferred amounts of the components are:
A) ≥30% by weight to ≤40% by weight
B) ≥1% by weight to ≤5% by weight
C) ≥6% by weight to ≤20% by weight
D) ≥40% by weight to ≤60% by weight.

Preferred embodiments of the method according to the present invention will now be more particularly described. They can be combined in any desired manner unless the contrary is apparent from the context.

In one embodiment, the cross-sectional area of the aperture or the sum total of the cross-sectional areas of all apertures amounts to ≥0.5% to ≤10% of the inner cross-sectional area of the discharge line. One aperture is preferably in the form of an outlet nozzle. Preferred ranges for the cross-sectional area of the aperture or the sum total of the cross-sectional areas of all apertures are ≥0.7% to ≤2.5%.

In a further embodiment, the ratio of the volume of a reaction chamber which is inside and/or outside the mixing head and in which supercritical conditions prevail, to the cross-sectional area of the aperture or to the sum total of the cross-sectional areas of all apertures is ≥5 m to ≤200 m.

The reaction chamber can be formed within the mixing head by the mixing chamber thereof. Outside the mixing head, the reaction chamber can be formed by that part of the discharge line which is upstream of the means for elevating the flow resistance in the step of discharging the mixture comprising A), B), C) and D). In the simplest case, therefore, the volume of the discharge line upstream of a perforate plate contributes to the volume of the reaction chamber.

The recited ratios provide optimum control over the flow of the mixture as a result of viscosity increase during the PU reaction. Preferred ratios are ≥10 m to ≤100 m.

In a further embodiment, the step of discharging the mixture comprising A), B), C) and D) from the flow resistance elevator means having one or more apertures is effected such that the ratio of the volume flow of the discharged mixture to the cross-sectional area of the aperture or to the sum total of the cross-sectional areas is ≥5 m/s to ≤400 m/s.

Again, the recited ratios provide optimum control over the flow of the mixture as a result of viscosity increase during the PU reaction. Preferred ratios are ≥40 m/s to ≤200 m/s.

In a further embodiment, a pressure of ≤40 bar to ≥150 bar prevails in the mixing head after the step of providing the mixture. This state can prevail particularly in a mixing head and downstream of a mixing head. The pressure can also be ≥80 bar to ≤120 bar or ≥60 bar to ≤100 bar. Pressures of this type will maintain supercritical or near-critical conditions for the blowing agent used.

In a further embodiment, the mixture in the mixing head has a residence time ≥0 seconds to ≤20 seconds, preferably ≥0.1 second to ≤10 seconds and more preferably ≥0.5 second, to ≤5 seconds under supercritical or near-critical conditions of the blowing agent. This ensures that the mixture can polymerize under supercritical or near-critical conditions. The residence time can be determined by the volume of the reaction chamber (=total volume of mixing chamber with efflux pipe up to the perforate plate) in which supercritical or near-critical conditions prevail, divided by the volume of mixture conveyed per unit time.

In a further embodiment, said isocyanate-reactive component A) comprises a polyetherester polyol having a hydroxyl number of ≥200 mg KOH/g to ≤600 mg KOH/g and a short-chain polyol having a hydroxyl number of ≥800 mg KOH/g. Suitable polyetherester polyols include bifunctional polyetherester polyol which are obtained by addition of alkylene oxides and especially ethylene oxide onto a mixture of phthalic anhydride, diethylene glycol and ethylenediamine and have an OH number of ≥275 mg KOH/g to ≤325 mg KOH/g.

Products of this type are available from Bayer MaterialScience AG under the trade name of Desmophen® VP.PU 1431. The OH number of the polyester polyol can also be ≥290 mg KOH/g to ≤320 mg KOH/g. Short-chain polyols are polyols having ≥2 to ≤6 carbon atoms in particular. Glycerol is preferred. It has an OH number of 1827 mg KOH/g. Adding the short-chain polyol is a favorable way to increase the polarity of the polyol phase.

In a further embodiment, surfactant component B) comprises a polysiloxane-polyoxyalkylene copolymer. The polysiloxane-polyoxyalkylene copolymer (silicone-glycol copolymer) preferably concerns compounds registered under CAS number 87244-72-2.

In a further embodiment, the proportion of blowing agent component C) is ≥4% by weight to ≤12% by weight, based on the overall weight of the mixture. Preferred proportions are ≥6% by weight to ≤10% by weight and particularly preferred proportions are ≥7% by weight to ≤9% by weight.

In a further embodiment, said polyisocyanate component D) comprises monomeric and/or polymeric diphenylmethane 4,4'-diisocyanate. A polyisocyanate of this type is available from Bayer MaterialScience under the trade name of Desmodur® 44V70L as a mixture of diphenylmethane 4,4'-diisocyanate (MDI) with isomers and higher-functional homologs.

The present invention further provides a polyurethane foam obtained or obtainable by a method of the present invention.

In one embodiment, the polyurethane foam has an apparent density of ≥20 kg/m$^3$ to ≤160 kg/m$^3$. Apparent density can be determined according to DIN EN 1602 and is preferably ≥30 kg/m$^3$ to ≤120 kg/m$^3$ and more preferably ≥40 kg/m$^3$ to ≤80 kg/m$^3$. Thermal insulation is among preferred uses for the foam of the present invention.

The examples which follow are offered by way of elucidation, not limitation, of the present invention.

Glossary:

Desmophen® VP.PU 1431: bifunctional polyetherester polyol, EO adduct onto a mixture of phthalic anhydride, diethylene glycol and ethylenediamine, with an OH number of 275 to 325 mg KOH/g and a viscosity of 6.5±1.3 Pa s at 25° C.; Bayer MaterialScience AG.

DABCO® DC198: product from Air Products; stabilizer/surfactant. DABCO® DC198 is a polysiloxane-polyoxyalkylene copolymer (silicone-glycol copolymer). Compounds of this type are registered under CAS number 87244-72-2.

DBTL: dibutyltin dilaurate.

Desmorapid® 726b: catalyst from Bayer MaterialScience AG.

Desmodur® 44V70L: mixture of diphenylmethane 4,4'-diisocyanate (MDI) with isomers and higher-functionality homologs from Bayer MaterialScience AG.

EXAMPLE 1 TO EXAMPLE 4 AND ALSO COMPARATIVE EXAMPLES COMPARATOR 1 AND COMPARATOR 2

$CO_2$-blown polyurethane foams were produced in accordance with the recipes recited below in Table 1. Unless otherwise stated, quantities are given in parts by weight. The mixture of isocyanate-reactive compound A) was mixed with added components such as surfactants B) and catalysts. It was used as the polyol component in a standard high-pressure mixing rig and mixed with blowing agent C) at a pressure of 120 bar. Supercritical conditions prevailed for the blowing agent during the mixing. This mixture was mixed in a high-pressure mixing head with a polyisocyanate D), which was conveyed at a pressure of 120 bar. The blowing agent was at least partly present in the form of an emulsion under the conditions prevailing in the mixing head.

Shot quantity was 60 g/s, corresponding to a volume stream of 72 ml/s (density of mixture 1.2 g/ml). The efflux pipe of the mixing head had an inner diameter of 8.5 mm and a length of about 50 cm. The total volume of the mixing chamber including the efflux pipe up to the perforate plate was 36 ml. A perforate plate having the hole size specified in the tables was fitted in the efflux pipe downstream of the mixing head in the inventive examples. This made it possible to set the pressure in the mixing head in a controlled manner and achieve a slower reduction in the pressure in the reaction mixture.

Comparative Examples 1 and 2, which were deliberately set to a low pressure in contrast to Examples 1 to 4, have a distinctly higher apparent density. This shows that distinctly worse use was made here of the blowing agent.

TABLE 1

|  | Example 1 | Example 2 | Example 3 | Example 4 | Comparator 1 | Comparator 2 |
|---|---|---|---|---|---|---|
| Desmophen ® VP.PU 1431 | 95.00 | 95.00 | 95.00 | 95.00 | 95.00 | 95.00 |

TABLE 1-continued

|  | Example 1 | Example 2 | Example 3 | Example 4 | Comparator 1 | Comparator 2 |
|---|---|---|---|---|---|---|
| glycerol | 15.00 | 15.00 | 15.00 | 15.00 | 15.00 | 15.00 |
| DABCO ® DC198 | 2.00 | 2.00 | 2.00 | 2.00 | 2.00 | 2.00 |
| DBTDL | 0.06 | 0.06 | 0.06 | 0.06 | 0.06 | 0.06 |
| Desmorapid ® 726b | 0.30 | 0.30 | 0.30 | 0.30 | 0.30 | 0.30 |
| $CO_2$ | 27.50 | 27.50 | 28.60 | 28.60 | 28.60 | 27.50 |
| Desmodur ® 44V70L | 137.89 | 137.89 | 151.67 | 151.67 | 151.67 | 137.89 |
| index | 100.00 | 100.00 | 110.00 | 110.00 | 110.00 | 100.00 |
| isocyanate temperature [° C.] | 36 | 35 | 35 | 35 | 35 | 34 |
| polyol temperature [° C.] | 35 | 34 | 34 | 34 | 34 | 34 |
| OH number of component A) [mg KOH/g] | 517 | 517 | 517 | 517 | 517 | 517 |
| shot time [s] | 10 | 10 | 10 | 10 | 10 | 10 |
| counterpressure [bar] | 95-87 | 92-78 | 81-75 | 50-40 | 2.6-2 | 2.8-2.1 |
| perforate plate [mm] | 0.8 | 1.2 | 0.8 | 1.2 | absent | absent |
| pipe diameter [mm] | 8.5 | 8.5 | 8.5 | 8.5 | 8.5 | 8.5 |
| residence time of mixture under super- or near-critical conditions [s] | 0.5 | 0.5 | 0.5 | 0.5 | none | none |
| free-rise density of core [kg/m³] | 94 | 101 | 113 | 90 | 238 | 223 |

What is claimed is:

1. A method of producing a polyurethane foam comprising the steps of:
   providing a mixture in a high-pressure mixing head, said mixture comprising:
   A) an isocyanate-reactive component;
   B) a surfactant component;
   C) a blowing agent component selected from the group consisting of a linear $C_1$ to $C_6$ hydrocarbon, a branched $C_1$ to $C_6$ hydrocarbon, a cyclic $C_1$ to $C_6$ hydrocarbon, a linear $C_1$ to $C_6$ fluorocarbon, a linear $C_1$ to $C_6$ hydrofluorocarbon, a branched $C_1$ to $C_6$ fluorocarbon, a branched $C_1$ to $C_6$ hydrofluorocarbon, a cyclic $C_1$ to $C_6$ fluorocarbon, a cyclic $C_1$ to $C_6$ hydrofluorocarbon, $N_2$, $O_2$, argon, and $CO_2$, wherein said blowing agent C) is in the supercritical or near-critical state; and
   D) a polyisocyanate component;
   discharging the mixture comprising A), B), C) and D) from the mixing head through a discharge line, wherein a pressure of ≥80 bar to ≤150 bar prevails in the mixing head after the step of providing the mixture,
   wherein said isocyanate-reactive component A) has a hydroxyl number of ≥100 mg KOH/g to ≤1000 mg KOH/g,
   said blowing agent component C) is at least partly present in the form of an emulsion, wherein the proportion of blowing agent component C) is ≥4% to ≤40% by weight based on the overall weight of the mixture, and
   one or more apertures are disposed in the discharge line to elevate the flow resistance during the step of discharging the mixture comprising A), B), C) and D), wherein the one or more apertures comprises a cross-sectional area, wherein the cross-sectional area of the one or more apertures or the sum total of a single cross-sectional area of each of said one or more apertures amounts to ≥0.1% to ≤99.9% of the inner cross-sectional area of the discharge line.

2. The method as claimed in claim 1 wherein the cross-sectional area of the one or more apertures or the sum total of a single cross-sectional area of each of said one or more apertures amounts to ≥0.5% to ≤10% of the inner cross-sectional area of the discharge line.

3. The method as claimed in claim 1 wherein the ratio of the volume of a reaction chamber which is inside and/or outside the mixing head to the cross-sectional area of the one or more apertures or to the sum total of the cross-sectional areas of all apertures is ≥5 m to ≤200 m.

4. The method as claimed in claim 1 wherein the step of discharging the mixture comprising A), B), C) and D) from the mixing head is effected such that the ratio of the volume flow of the mixture to the cross-sectional area of the one or more apertures or to the sum total of the cross-sectional areas is >5 m/s to <400 m/s.

5. The method as claimed in claim 1 wherein the mixture in the mixing head has a residence time ≥0 seconds to ≤20 seconds.

6. The method as claimed in claim 1 wherein said isocyanate-reactive component A) comprises a polyetherester polyol having a hydroxyl number of ≥200 mg KOH/g to ≤600 mg KOH/g and a short-chain polyol having a hydroxyl number of ≥800 mg KOH/g.

7. The method as claimed in claim 1 wherein said surfactant component B) comprises a polysiloxane-polyoxyalkylene copolymer.

8. The method as claimed in claim 1 wherein the proportion of blowing agent component C) is ≥4% by weight to ≤12% by weight, based on the overall weight of the mixture.

9. The method as claimed in claim 1 wherein said polyisocyanate component D) comprises monomeric and/or polymeric diphenylmethane 4,4'-diisocyanate.

10. A polyurethane foam obtained by the method of claim 1.

11. The polyurethane foam as claimed in claim 10 with an apparent density of ≥20 kg/m³ to ≤160 kg/m³.

12. The method as claimed in claim 1, wherein said isocyanate-reactive component A) comprises a polyether-ester polyol having a hydroxyl number of ≥200 mg KOH/g to ≤600 mg KOH/g and a short-chain polyol having a hydroxyl number of ≥800 mg KOH/g, and wherein the polyurethane foam has an apparent density of 30 kg/m³ to ≤120 kg/m³.

13. The method as claimed in claim 12, wherein the proportion of blowing agent component C) is >7% by weight to <9% by weight, based on the overall weight of the mixture.

14. The method as claimed in claim 1 wherein the mixture in the mixing head has a residence time ≥0.5 seconds to ≤5 seconds.

* * * * *